(12) United States Patent
Berghaus et al.

(10) Patent No.: US 6,666,998 B2
(45) Date of Patent: Dec. 23, 2003

(54) METHOD AND DEVICE FOR PRODUCING AT LEAST PARTIALLY OPEN-CELLED FOAM FILMS FROM STYRENE POLYMERS

(75) Inventors: Ulrich Berghaus, Troisdorf (DE); Stephan Homer, Mönchengladbach (DE); Hubert Jansen, Lohmar (DE)

(73) Assignee: Reifenhäuser GmbH & Co. Maschinenfabrik, Troisdorf (DE)

( * ) Notice: Subject to any disclaimer, the term of this patent is extended or adjusted under 35 U.S.C. 154(b) by 0 days.

(21) Appl. No.: 10/049,530

(22) PCT Filed: Jun. 6, 2001

(86) PCT No.: PCT/EP01/06413
§ 371 (c)(1),
(2), (4) Date: Feb. 13, 2002

(87) PCT Pub. No.: WO02/00774
PCT Pub. Date: Jan. 3, 2002

(65) Prior Publication Data
US 2002/0177631 A1 Nov. 28, 2002

(30) Foreign Application Priority Data
Jun. 13, 2000 (DE) .......................... 100 28 386

(51) Int. Cl.⁷ ..................... B29C 43/22; B29D 7/00
(52) U.S. Cl. ................. 264/45.8; 264/45.9; 264/46.1; 521/79; 521/81; 521/149
(58) Field of Search ............... 264/45.8, 45.9, 264/46.1; 521/79, 81, 149

(56) References Cited

FOREIGN PATENT DOCUMENTS

| DE | 88 01 585.8 | 7/1988 |
|---|---|---|
| DE | 40 39 354 A 1 | 6/1992 |
| EP | 0 849 309 A1 | 6/1998 |
| EP | 1 164 091 A2 | 12/2001 |
| FR | 2.041.488 | 1/1971 |
| WO | WO 96/00258 | 1/1996 |
| WO | WO 98/10015 | 3/1998 |
| WO | 99/15415 | 4/1999 |
| WO | WO 99/47592 | 9/1999 |

*Primary Examiner*—Morton Foelak
(74) *Attorney, Agent, or Firm*—Pauley Petersen Kinne & Erickson

(57) ABSTRACT

A method for producing an at least partially open-celled foam foil on a basis of styrene polymers, nucleating agents, surfactants, physical foaming agents and, if required, further additives, such as foreign polymers and auxiliary materials, comprising a twin-screw extruder with identical parallel screws rotating in the same direction, wherein the twin-screw extruder has a length of at least 25 D (D=screw diameter), in particular 30 to 42 D, with a draw-in and plastification zone of a length of 10 to 15 D, and a mixing zone of a length of 3 to 6 D, and a following cooling zone.

42 Claims, 2 Drawing Sheets

METHOD AND DEVICE FOR PRODUCING AT LEAST PARTIALLY OPEN-CELLED FOAM FILMS FROM STYRENE POLYMERS

BACKGROUND OF THE INVENTION

1. Field of the Invention

This invention relates to a method for producing an at least partially open-celled foam foil from styrene polymers, as well as a device for producing the same, using a twin-screw extruder.

2. Description of Related Art

At least partially open-celled foam foils are used where absorption capabilities, for example, are required, in particular for fluids, or foils permeable to water vapor and air are desired. A preferred area of application for such partially open-celled foam foils made of styrene polymers is in connection with packaging and containers. Foam foils are also processed in many ways into end products, for example shells, by subsequent thermal deformation.

A method for producing an extruded, open-celled foam material on the basis of styrene polymers is known from PCT International Publication WO 96/00258, wherein the polymer is melted in a single-screw extruder. The open-celled foam foils produced are used in particular as insulating elements for roofs.

Furthermore, a method for producing an open-celled polystyrene foil for packaging shells is known from European Patent Reference EP 0 849 309 A1, wherein a mixture of polystyrene, which contains incorporated aliphatic hydrocarbons with 4 to 6 carbon atoms and, if required, additional polystyrene, as well as nucleating agents, is melted in a twin-screw extruder at temperatures between 130 to 150° C. and is extruded, wherein twin-screw extruders with an L/D ratio of 20 are employed.

SUMMARY OF THE INVENTION

One object of this invention is to provide an efficient method for producing at least partially open-celled foam foils on the basis of styrene polymers, whose properties can be flexibly matched to various requirements, such as the degree of openness of the cells, density, thickness and polymer composition. It is another object to provide an open-celled foam structure which allows the passage of gases and fluids and allows a selectively adjustable, specific absorption of polar/non-polar fluids, as well as a specific absorption capability for polar fluids.

In accordance with this invention, this object is attained with a method in accordance with the features of this specification and the claims.

A method in accordance with this invention for producing an at least partially open-celled foam foil on the basis of styrene polymers uses a mixture, which contains 0.5 to 3 parts by weight of at least one nucleating agent, 0.5 to 3.5 parts per weight of at least one surfactant, and 1 to 3 parts per weight of a foreign polymer, which cannot be mixed with polystyrene, per 100 parts per weight of styrene polymer. The mixture is melted in a twin-screw extruder with screws rotating in the same direction at a temperature of up to 270° C., and 2 to 6 wt.-% of at least one physical foaming agent in relation to the amount of styrene polymer employed is injected into the polymer melt at an injection pressure, which is above the cylinder pressure of the twin-screw extruder at the injection point and is higher than that for dissolving the foaming agent in the polymer, or sufficiently high for making possible a homogeneously distributed, two-phase system of melt/foaming agent. The polymer melt is brought to a material temperature between 160 and 180° C. while being homogeneously mixed and prior to moving out of the twin-screw extruder into the nozzle tool with an annular nozzle, and is extruded under a pressure of up to 55 bar out of the nozzle into the atmosphere in the form of a tube. The tube is cooled on the inside and the outside while expanding and is pulled over a cooling and calibration mandrel, and is cut open after it has become sufficiently firm and is laid flat as the foamed foil.

The injection pressure is preferably in the range between 30 and 160 bar.

Advantageous further embodiments of this invention are taken from the method claims.

A further object of this invention is to provide a device for producing an at least partially open-celled foam foil on the basis of styrene polymers, nucleating agents, surfactants, physical foaming agents and, if required, further additives, such as foreign polymers and auxiliary materials, comprising a twin-screw extruder with a draw-in and plastification zone, mixing zone and cooling zone. The styrene polymers with the nucleating agent, surfactant, additives are conducted, if required at least partially as a pre-mix, to the twin-screw extruder and are melted to form a polymer melt. The physical foaming agent is injected under increased pressure into the polymer melt, the polymer melt already injected with gas is cooled to a temperature suitable for foaming and lying below the melt temperature of the styrene polymer, and thereafter exits into the atmosphere from the nozzle of the twin-screw extruder in the form of a tube while expanding. The tube is cooled and cut open in a longitudinal direction and laid flat as the foamed foil.

In accordance with this invention, the extruder for melting the polymer, mixing the polymer melt with the physical foaming agent and cooling the expandable polymer melt thus obtained is a twin-screw extruder of a length of at least 25 D, in particular 30 to 42 D and having identical parallel screws rotating in the same direction. The physical foaming agent can be introduced into the melted polymer by the conveying device at an injection pressure of less than 160 bar, in particular between 30 to 150 bar, at the end of the draw-in and plastification zone of an approximate length of 10 to 15 D of the twin-screw extruder. The physical foaming agent can be mixed with the molten polymer in the mixing zone of a length corresponding to 3 to 6 D of the twin-screw extruder adjoining the draw-in and plastification zone to form an expandable polymer melt.

Advantageous further embodiments of a device of this invention are taken from features of the dependent claims.

In accordance with this invention, it is possible to create polystyrene foam with an pen-celled foam structure for the passage of gases and fluids, and with a selectively adjustable specific absorption of polar and non-polar fluids. The absorption capability for fluids is a function of the surface tension of the retained fluid. With an initially high surfactant absorption, an initially high wetting effect results, however, the absorption capability for polar fluids rises with a decrease in the concentration of the surfactant at the cell wall. The surfactant is required for absorptive wetting of polar fluids.

The homo-, as well as the copolymers of styrene are employed as the styrene polymer for the foam foils to be produced, as well as mixtures or blends of polystyrene with other substances, as well as high-molecular substances produced by the polymerization of styrene by heat or with peroxide catalysts, such as products made by substance polymerization, as well as the copolymers of styrene with acrylonitrile and/or butadiene, or acrylonitrile and acrylic esters, or the graft polymers, wherein styrene is polymerized with the addition of natural or synthetic caoutchouc, such as styrene butadiene caoutchouc. Styrene homopolymers are preferred for the foam foils in accordance with this invention.

With the method in accordance with this invention, a physical foaming process and the use of twin-screw extruders produce foam foils made of styrene polymers having a proportion of at least 25% of open cells. During this, foam foils with a density of 40 to 100 kg/m$^3$ or more are obtained, wherein foam foils of a thickness from 0.3 to 10 mm, preferably 1 to 5 mm, are produced. The foam foils preferably have a cell size in the range between 150 μm to 900 μm.

In accordance with this invention, an extrusion process with an expansion process in the manner of a blow molding process is employed. The expandable polymer melt, which exits a ring-shaped nozzle of the extruder in the form of a tube, is immediately cooled on the inside and the outside, for example by cooling air, and is charged with pressure on the inside in order to achieve an expansion ratio greater than 1, in particular 1:3 to 1:5 and to calibrate the tube after expansion by a cooling and calibration mandrel and to cool it by contact with the cooling and calibration mandrel. It is possible during this to subject the foam foil produced as a tube to a stretching process. The desired expansion ratio is primarily also a function of the desired thickness.

Organic foaming agents from the group of aliphatic hydrocarbons with 1 to 9 carbon atoms are particularly suitable as the physical foaming agents, such as methane, ethane, propane, n-butane, isobutane, N-pentane, isopentane and/or neopentane, and/or inorganic foaming agents such as carbon dioxide, and nitrogen. It is possible to either employ only a single foaming agent, or also a mixture of foaming agents. When employing mixtures of foaming agents, for example when using two or more foaming agents, they are supplied to the polymer melt separately and directly one after the other. In this case the foaming agents are injected into the polymer melt by a pressure conveying device with a high degree of accuracy, metering device. It is essential for this invention that an injection pressure range is maintained, which preferably lies between 30 to 160 bar, more preferably between 30 to 70 bar. In this case the injection pressure is higher than the pressure above the cylinder pressure at the injection point, and it needs to be higher than the pressure required for dissolving the foaming agent in the polymer, or sufficiently high for making possible a homogeneously distributed two-phase system of a melt/foaming agent.

The amount of physical foaming agent is determined by the desired density of the foam material and by the degree of cell openness. When using aliphatic hydrocarbons, in particular from the group n-butane, n-pentane, isopentane or mixtures thereof, 3 to 4 parts by weight of foaming agent per 100 parts by weight of styrene polymer have been shown to be suitable.

Polymer/foaming agent mixtures can be single-phase (foaming agent completely dissolved, or foaming agent partially dissolved, partially liquid) or multi-phase (melt liquid, foaming agent gaseous, finely dispersed, or foaming agent above the solution threshold is gaseous ($CO_2/N_2$)).

The open cell content can also be adjusted by the nucleating agent, wherein higher amounts of nucleating agent increase the proportion of open cells in the foam foil. Suitable nucleating agents are calcium carbonate, calcium stereate, talcum, titanium dioxide, silica, barium stereate, diatomaceous earth and/or mixtures of citric acid and sodium bicarbonate, wherein amounts of 0.6 to 1.5 parts by weight per 100 parts by weight of styrene polymer have been shown to be sufficient.

A high temperature profile, which causes high gas pressure at the same time, leads to openness of the cells when the cells have low wall strength.

A further option of encouraging openness of the cells and the proportion of open cells includes the addition of a foreign polymer in small amounts, wherein foreign polymers which cannot be mixed with styrene polymer are used, for example polyolefins or ethylene-vinyl acetate copolymer. Among the polyolefins, HDPE, LDPE and LLDPE, or polyolefin waxes, are particularly suitable.

Interfaces with the foreign polymers form predetermined wetting points because of low surface tension.

To increase the absorption capability and absorbency of the produced foam foil, it can be practical for increasing the absorption capability for aqueous fluids, in particular polar fluids, to add surfactants, in particular on the basis of alkane sulfonate, to the polymer mixture. It is also possible to employ surfactants with antistatic properties. The holding capacity of the fluids is a result of the surface tension of the absorbed fluid. Surfactants are required for absorbing polar fluids. The absorption capacity is defined and controlled primarily by the number of open cells, secondarily by the foam morphology and, in relation to the selective substance absorption, with a surfactant.

It is also possible to add to the polymer mixture auxiliary materials, such as inorganic fillers, pigments, antioxidants, UV absorbers, flame-protection agents, soot, anti-static agents, processing aids, lubricants and/or waxes, in customary amounts.

It is also possible to employ the method of this invention with a polymer mixture with which up to 50 wt.-% or more of a regenerated styrene polymer are used instead of fresh material.

An at least partially open-celled foam material foil, which is for example suitable for producing packaging shells, can be produced in accordance with this invention, from a composition of 100 parts by weight of polystyrene, 3 to 4 parts by weight of foaming agent, selected from the group of n-butane, n-pentane, isopentane, or mixtures thereof, 0.6 to 1.5 parts by weight of nucleating agents from sodium bicarbonate and citric acid with a decomposition temperature of greater than 160° C., 1 to 3.5 parts by weight of a surfactant, which reacts well with polar substances such a polystyrene, and 1 to 3 parts by weight of a foreign polymer incapable of mixing with polystyrene, such as a polyolefin or ethylene-vinyl acetate copolymer. The foam foils produced in this way basically have a dense outer skin and an at least partially open-celled core layer, wherein this outer skin is smoother on the calibrated side than on the non-calibrated side. Absorption capability is provided because one or both sides of the foam foil are needled or are opened by roughening or perforating. With thick foam foils it is also possible to split these, so that a foil is obtained which remains fluid-proof on one side, and on the other side is completely open for absorbing fluids.

Nucleating agents on the basis of sodium bicarbonate and citric acid, which are bound by a polymer binding agent on the basis of an acrylate polymer, preferably at a ratio of nucleating agent to polymer binding agent of 55:45 to 65:35, have been shown to be particularly advantageous for processing in a polymer mixture.

The production in accordance with this invention of an at least partially open-celled foam foil based on styrene polymers depends on the selection of a suitable mixture of raw materials, together with a specially designed twin-screw extruder with identical parallel screws rotating in the same direction, gas injection of a physical foaming agent at relatively low pressures. In particular, melting of the styrene polymer, injection of the physical foaming agent into the polymer melt, and cooling of the expandable polymer melt already injected with gas, which is thus obtained, to the outlet temperature is performed in a twin-screw extruder with a draw-in and plastification zone, mixing zone and cooling zone and a ring-shaped outlet nozzle of a length of at least 25 D, in particular 30 to 42 D (D=screw diameter) with identical parallel screws rotating in the same direction, and the physical foaming agent is introduced into the polymer melt at an injection pressure, preferably lower than 160 bar, in particular between 30 to 160 bar, preferably 30 to 70 bar, at the end of the draw-in and plastification zone of the twin-screw extruder and, in the mixing zone adjoining the draw-in and plastification zone, is homogenized with the polymer melt to form an expandable polymer melt and cooled to the outlet temperature. In accordance with a further embodiment of this invention, the method is performed so that the twin-screw extruder has such an amount of polymer that it is operated with a standing column or underfed. With this the mixing of the polymer with the nucleating agent and the physical foaming agent can be intensified, and thus an even better result can be achieved.

Twin-screw extruders with screw diameters of preferably 40 to 130 mm, particularly preferred are 65 to 125 mm, can be employed for the method and the device in accordance with this invention. The draw-in and plastification zone is designed in a length corresponding to approximately 10 to 15 D in order to assure the complete melting of the polymer provided with the nucleating agent. With the particularly intensive mixing operations in the twin-screw extruder, the method in accordance with this invention makes it possible to design the special mixing zone, in which the physical foaming agent is introduced into the polymer melt, very short, namely approximately 3 to 6 D, and yet to obtain a particularly even structure and a good surface quality of the foamed foil. With a total length of the twin-screw extruder of approximately 30 to 42 D, a sufficiently long section, embodied as the cooling zone, adjoins this mixing zone in order to cool the expandable polymer melt during the homogenization from the melting temperature of up to 270° C. to a material temperature between 160 and 180° C. prior to its exit from the twin-screw extruder.

Nucleating agents are advantageously already added to the polymer while it is fed to the twin-screw extruder in order to make the subsequent foaming easier. Different foaming agents are supplied to the polymer melt separately and immediately following each other at the end of the draw-in and plastification zone of the twin-screw extruder.

To produce the foam foil made of styrene polymers, the expandable polymer is preferably extruded from a ring-shaped nozzle, and the pipe-shaped tube is cooled on the inside and/or the outside after leaving the nozzle, preferably charged with cooling air. This charging can take place, for example, by blowing. Here, the cooling air should have a temperature preferably in the range between 5 and 50° C., preferably below room temperature. It is also possible to blow cooling air against the tube on the outside and/or the inside by means of appropriate cooling rings attached to the nozzle.

The inside of the foamed tube exiting from the ring-shaped nozzle can also be charged with compressed air for transverse stretching, so that the tube is expanded and the diameter of the pipe-shaped tube is increased and the pipe-shaped tube is stretched. The longitudinal stretching is caused when drawing the foam foil off, for example by an appropriately increased draw-off speed with respect to the exit speed from the nozzle. The tube expanded in this way is subsequently conducted over a cooling and calibration mandrel, which further cools the pipe-shaped tube by contact cooling and at the same time calibrates its diameter. The cooling and calibration mandrel provides the correct temperature by a flow of water through it, which is tempered to a suitable temperature below 65° C., preferably in the range of 25 to 65° C., by a tempering apparatus. The expansion ratio which can be achieved with the method of this invention, for example the ratio of the diameter of the outlet opening of the tube from the ring-shaped nozzle to the diameter of the cooling and calibration mandrel is approximately 1:2 to 1:5, depending on the density.

After the foamed tube is conducted over the cooling and calibration mandrel and is sufficiently cooled, it is either continuously slit open along one side for forming a flat foil web, or into two foam foil webs on two sides located opposite each other.

The foam foils thus formed and laid flat are continuously drawn off by a draw-off device and can either be rolled up or conducted in a line for further processing, for example to a laminating station or a deep-drawing station.

The foam foil produced in accordance with the method of this invention can directly be laminated on one or both sides with a suitable functional layer, for example a single-layer or multi-layer compact, for example not foamed, foil of a thermoplastic material or another material. Lamination can advantageously follow the production of the foam foil in line.

Moreover, a particularly advantageous embodiment of this invention is proposed, namely that the expandable polymer melt already injected with gas is coated inside the ring-shaped nozzle prior to discharge, with at least one material, which is compact or expandable and extruded, for example a thermoplastic material. In this case a further extruder is provided for feeding each thermoplastic material, wherein the outlet nozzle of the twin-screw extruder is designed as a co-extrusion nozzle.

BRIEF DESCRIPTION OF THE DRAWINGS

This invention is explained in greater detail in view of an exemplary embodiment shown in the drawings, wherein.

DESCRIPTION OF PREFERRED EMBODIMENTS

Figure 1:
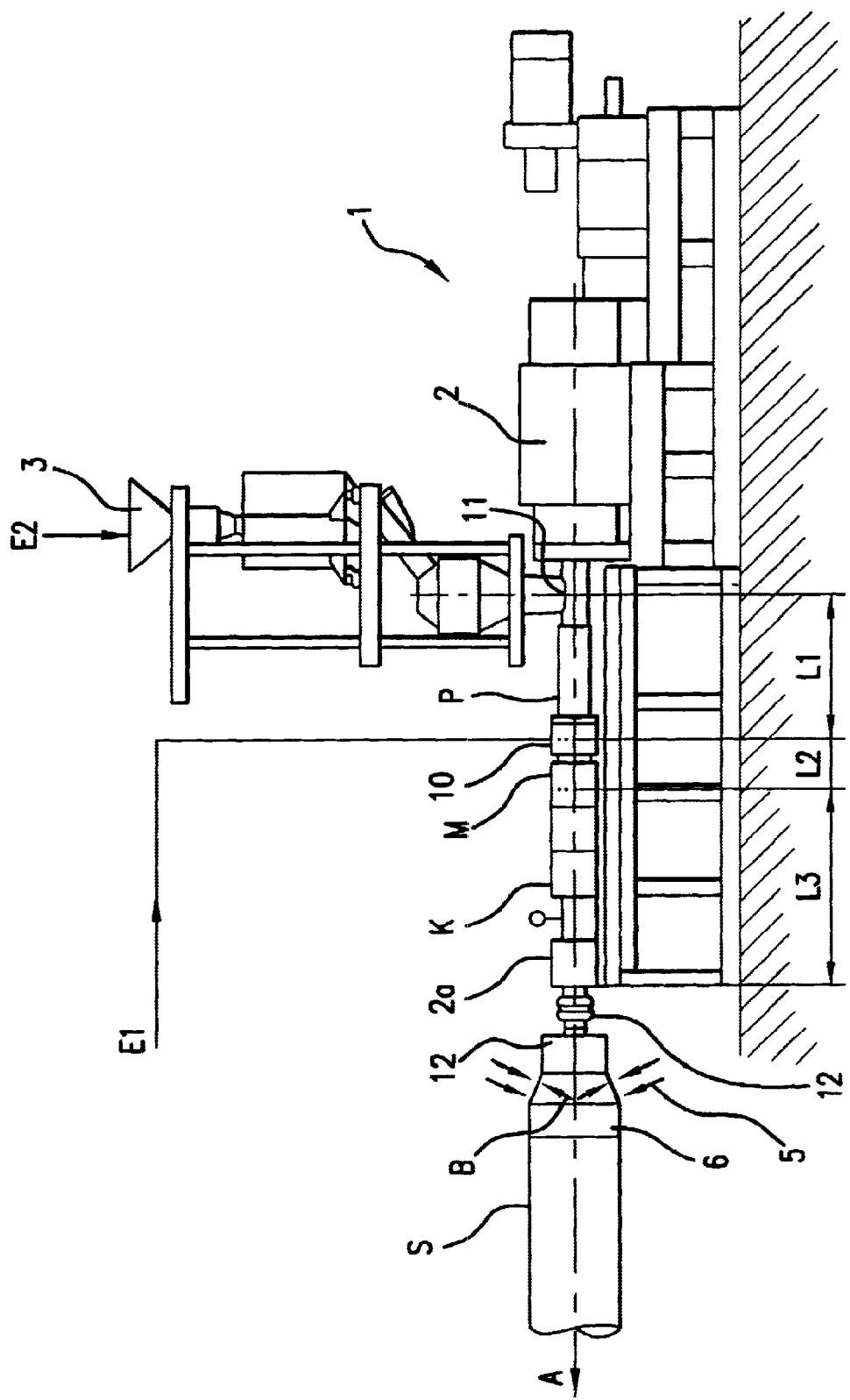
FIG. 1 is a diagrammatic plan view of a device for executing the method.

As represented in FIG. 1, the device for producing a foam foil made of styrene polymer comprises a twin-screw extruder 1 having a cylinder with identical parallel screws on the inside, which rotate in the same direction, and an outlet end with a preferably ring-shaped nozzle 12 attached. The twin-screw extruder 1 is driven by a drive mechanism 2.

The polymer used for producing the foamed foil, for example polystyrene, is conveyed from a storage facility 13 via a conveyor E2 to a metering device 3, in which it is mixed with the nucleating agent, foreign polymer, surfactant and possibly further additives. This mixture is moved into the twin-screw extruder 1 from the metering device 3 through the draw-in opening 11 in the cylinder.

A draw-in and plastification zone extends from the draw-in opening 11 of the twin-screw extruder 1 in the working direction A of the twin-screw extruder 1 and has a length L1 of approximately 10 to 15 D, wherein D is the screw diameter. The polymer is heated in this draw-in and plastification zone to temperatures no higher than 270° C. and is melted, and is completely plastified at the end of the draw-in and plastification zone.

At the end of the draw-in and plastification zone the physical foaming agent, which is fed in via a line E1 by means of a conveyor, not represented, is introduced into the polymer melt through an opening 10 in the cylinder of the twin-screw extruder 1. The polymer melt already injected with gas is subsequently intensely mixed through by the screws of the twin-screw extruder 1 rotating in the same direction in the mixing zone M of the twin-screw extruder 1, which adjoins the opening and has a length L2 of approximately 3 to 6 D, so that an expandable polymer melt with a particularly even and fine distribution of the foaming agent is obtained.

In the cooling zone of the twin-screw extruder 1 of a length L3 adjoining the mixing zone M, the expandable melt is further homogenized and mixed, wherein it is tempered to a temperature suitable for exiting through the nozzle with the appropriate cooling of the cylinder of the twin screw in the cooling zone, i.e. to a temperature of approximately 160 to 180° C. when it exits through the ring-shaped nozzle 12. The total length L of the twin-screw extruder 1 preferably is 30 to 42 D, wherein D is selected to be in the range of 50 to 130.

The expandable melt exits the ring-shaped nozzle 12 as a pipe-shaped tube S and is cooled on the outside by cooling air 5 of ambient temperature, preferably below 10° C., blown against it.

At the same time the tube S is inflated by the compressed air introduced in accordance with the arrow B and blown opposite the exit direction of the tube S into the interior of the latter and is cooled, for example its diameter is increased. Thereafter the tube S with its increased diameter is drawn over a cooling and calibration mandrel 6. The cooling and calibration mandrel 6 has a cooling medium by a tempering device, so that the tube S undergoes further interior cooling by contacting the cooling and calibration mandrel 6. The expansion ratio, for example the diameter of the outlet opening of the tube S from the ring-shaped nozzle 12 to the cooling and calibration mandrel 6 is approximately 1:2 to 1:5.

Following further cooling of the tube S at the exterior surfaces of the cooling and calibration mandrel 6, the tube S has solidified sufficiently so that it can be cut open in the longitudinal direction at two oppositely located areas by means of a cutting device, not represented, for example knives. In the process, two foam foil webs are formed from the tube S, which are laid flat and are drawn off by a draw-off device, not represented, containing several draw-off rollers.

It is possible with the appropriate selection of the draw-off device, not represented, to stretch the solidified, but not yet hardened foam foils in their longitudinal direction in order to prevent the formation of folds and to obtain a smooth surface.

To produce foamed foils, which are to be coated with a compact or foamed foil of a different thermoplastic material, such as can be required for packaging of foodstuffs or insulations, the ring-shaped nozzle 12 can be designed as a co-extrusion nozzle for coating the polymer melt already injected with gas with at least one other material prior to its exit from the nozzle 12, wherein a further so-called co-extruder is advantageously employed for feeding in any further materials.

Example

A formulation consisting of 100 parts by weight of styrene polymer, 1.4 parts by weight of a nucleating agent of a mixture containing 55 wt.-% of citric acid and bicarbonate and of a decomposition temperature higher than 160° C., and 45 wt.-% of an acrylate-polymer binder, as well as 2.5 parts by weight of an alkyl sulfonate as the surfactant, and 1.9 parts by weight of HDPE granules as the foreign polymer, was fed at a screw rotation rate of 30 rpm into a twin-screw extruder with two identical parallel screws, which rotate in the same direction, each of a diameter (D) of 85 mm, via a metering device at 200 to 250 kg/h. The polymer was completely plastified in the draw-in and plastification zone of a length of 15 D and heated to a temperature between 220 and 270° C. At the end of the draw-in and plastification zone at a temperature of approximately 220° C., 3.5 parts by weight of n-butane as the physical foaming agents were injected at a pressure of 65 bar into the polymer melt, and the polymer melt injected with gas was thus mixed in a mixing zone of a length of 4 D.

Thereafter the polymer melt injected with gas was tempered during continued mixing in the cooling zone of approximately 14 D length until the exit from the nozzle and was brought to a temperature of approximately 167° C. in the cylinder prior to exiting through the nozzle. The expandable molten mass was extruded at a temperature of approximately 167° C. at a pressure of 40 bar through the ring nozzle, wherein the nozzle gap was 1.4 mm. The exiting expanding tube was inflated at a ratio of 1:2.5 with compressed air at room temperature and was subsequently drawn off at a draw-off speed of 11 mm/min over a cooling and calibration mandrel cooled by a tempering device, wherein during inflation the outside of the tube was charged with cooling air at room temperature of 15° C. or less. After cooling to a temperature below 150° C. and solidification, the tube was cut on both sides in the longitudinal direction, and the foam foils thus obtained were laid flat and subsequently rolled up.

The foam foil obtained had a thickness of 2.5 mm, a bulk density of 0.07 g/cm$^3$ and a partially open-celled structure with a mean diameter of the cells between 500 and 700 mm. Following the opening of the surface skin by perforation, the foam foil was capable of absorbing at least six times its own weight of water.

Figure 2:
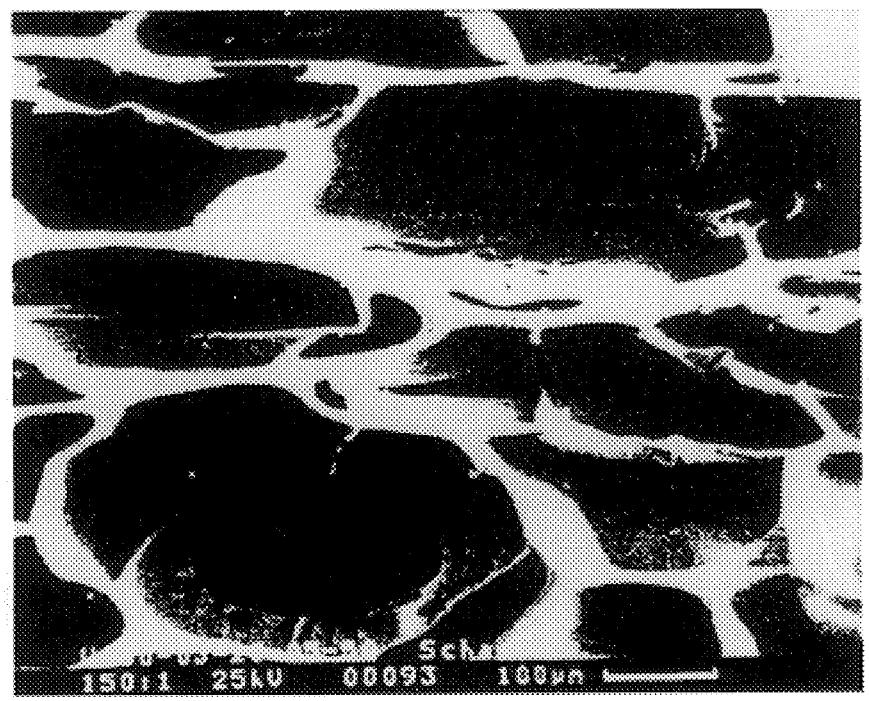
FIG. 2 is an enlarged partial representation of the partially open-celled foam foil in accordance with one exemplary embodiment.

An enlarged portion from the interior of a foam foil in accordance with the example with a partially open cell structure is represented in FIG. 2, wherein 100 µm correspond to 1 cm in the scale.

What is claimed is:

1. In a method for producing an at least partially open-celled foam foil from styrene polymers, a mixture comprising:
   0.5 to 3 parts by weight of at least one nucleating agent;
   0.5 to 3.5 parts per weight of at least one surfactant;
   1 to 3 parts per weight of a foreign polymer, which cannot be mixed with polystyrene;
   per 100 parts per weight of styrene polymer, is melted in a twin-screw extruder with screws rotating in a same direction at a temperature of up to 270° C.; and 2 to 6 wt.-% of at least one physical foaming agent in relation to the amount of styrene polymer employed which is injected into the polymer melt at an injection pressure above a cylinder pressure of the twin-screw extruder at an injection point and is higher than a pressure for dissolving the foaming agent in the polymer, or sufficiently high for making possible a homogeneously distributed, two-phase system of melt/foaming agent, preferably at a pressure between 30 and 160 bar, and a polymer melt is brought to a material temperature between 160° C. and 180° C. while being homogeneously mixed and prior to moving out of the twin-screw extruder into a nozzle tool with an annular nozzle, and is extruded under a second pressure of up to 55 bar out of the nozzle into atmosphere in a form of a tube, the tube is cooled on the inside and the outside while expanding and is pulled over a cooling and calibration mandrel, and is cut open after solidified and is laid flat as a foamed foil.

2. In the method in accordance with claim 1, wherein a foam foil with a proportion of open cells of at least 25% is obtained.

3. In the method in accordance with claim 2, wherein the foam foil has a density of 40 to 100 kg/m$^3$ or greater.

4. In the method in accordance with claim 3, wherein the foam foil has a thickness of 0.3 to 10 mm.

5. In the method in accordance with claim 4, wherein organic foaming agents from a group of aliphatic hydrocarbons with 1 to 9 carbon atoms, including methane, ethane, propane, n-butane, isobutane, N-pentane, isopentane and/or neopentane, and/or inorganic foaming agents such as carbon dioxide, nitrogen, are employed as physical foaming agents.

6. In the method in accordance with claim 5, wherein calcium carbonate, calcium stereate, talcum, titanium dioxide, silica, barium stereate, diatomaceous earth and/or mixtures of citric acid and sodium bicarbonate are used as the at least on nucleating agent.

7. In the method in accordance with claim 6, wherein surfactants on the basis of alkane sulfonate are employed for increasing an absorption capability for polar fluids.

8. In the method in accordance with claim 7, wherein auxiliary materials, such as inorganic fillers, pigments, antioxidants, UV absorbers, flame-protection agents, soot, anti-static agents, processing aids, lubricants and/or waxes are admixed to the polymer mix.

9. In the method in accordance with claim 8, wherein one of a polyolefin and an ethylene-vinyl acetate copolymer is used as the foreign polymer.

10. In the method in accordance with claim 9, wherein the tube exiting the nozzle and expanding is cooled on at least one of the outside and an inside by cooling air at a temperature at or below room temperature.

11. In the method in accordance with claim 10, wherein the tube exiting the nozzle and expanding is cooled on the inside by the cooling and calibration mandrel which is tempered to a temperature of 25° C. to 65° C.

12. In the method in accordance with claim 11, wherein melting of the styrene polymer, injection of the physical foaming agent into the polymer melt, and cooling of the expandable polymer melt already injected with gas, to the outlet temperature is performed in the twin-screw extruder with a draw-in and plasfification zone, a mixing zone and a cooling zone, a ring-shaped outlet nozzle of a length of at least 25 times a diameter (D) of a screw of the twin-screw extruder having identical parallel screws rotating in the same direction, and the physical foaming agent is introduced into the polymer melt at a pressure of less than 160 bar at an end of the draw-in and plastification zone of the twin-screw extruder and, in the mixing zone adjoining the draw-in and plastification zone, is homogenized with the polymer melt to form an expandable polymer melt and is cooled to an outlet temperature.

13. In the method in accordance with claim 12, wherein the twin-screw extruder has an amount of polymer at which it is operated underfed.

14. In the method in accordance with claim 13, wherein two or more different foaming agents are are fed separately and immediately following each other to the polymer melt.

15. In the method in accordance with claim 14, wherein the tube which exits the ring-shaped nozzle is charged on at least one of the inside and the outside with cooling air to achieve an expansion ratio of 1:2 to 1:5, and after expansion the tube is calibrated with the cooling and calibration mandrel and is cooled by contact.

16. In the method in accordance with claim 14, wherein the tube which exits the nozzle is conducted directly on at least one of the inside and the outside to a cooling device via a cooling ring which blows cooling air.

17. In the method in accordance with claim 16, wherein the pipe-shaped tube is stretched by a factor of 3 in a longitudinal extension while drawn off the nozzle.

18. In the method in accordance with claim 17, wherein the polymer melt which is injected with gas and expandable is coated with at least one of a compact material and an expandable material inside the ring-shaped nozzle prior to leaving the nozzle.

19. In the method in accordance with claim 18, wherein after the tube is cut open, the foam foil, which is laid flat, is laminated with one of a single-layer and a multi-layer compact or expandable foil on one of one side and both sides.

20. In the method in accordance with claim 19, wherein a partially open foam foil is produced from 100 parts by weight of polystyrene, 3 to 4 parts by weight of foaming agent, selected from a group of n-butane, n-pentane, isopentane, or mixtures thereof, 0.6 to 1.5 parts by weight of nucleating agents from sodium bicarbonate and citric acid with a decomposition temperature of greater than 160° C., 1 to 3.5 parts by weight of a surfactant, which reacts well with polar substances such a polystyrene, and 1 to 3 parts by weight of a foreign polymer incapable of mixing with polystyrene, such as a polyolefin or ethylene-vinyl acetate copolymer.

21. In the method in accordance with claim 20, wherein the nucleating agent is employed, together with a polymer binding agent on the basis of an acrylate polymer, at a ratio of nucleating agent to polymer binding agent of 55:45 to 65:35.

22. In the method in accordance with claim 21, wherein up to 50 wt.-% of a regenerated styrene polymer is used in lieu of fresh material.

23. In the method in accordance with claim 1, wherein a foam foil has a density of 40 to 100 kg/m$^3$ or greater.

24. In the method in accordance with claim 1, wherein the foam foil has a thickness of 0.3 to 10 mm.

25. In the method in accordance with claim 1, wherein organic foaming agents from a group of aliphatic hydrocarbons with 1 to 9 carbon atoms, including methane, ethane, propane, n-butane, isobutane, N-pentane, isopentane and/or neopentane, and/or inorganic foaming agents such as carbon dioxide, nitrogen, are employed as physical foaming agents.

26. In the method in accordance with claim 1, wherein calcium carbonate, calcium stereate, talcum, titanium dioxide, silica, barium stereate, diatomaceous earth and/or mixtures of citric acid and sodium bicarbonate are used as the at least on nucleating agent.

27. In the method in accordance with claim 1, wherein surfactants on the basis of alkane sulfonate are employed for increasing an absorption capability for polar fluids.

28. In the method in accordance with claim 1, wherein auxiliary materials, such as inorganic fillers, pigments, antioxidants, UV absorbers, flame-protection agents, soot, anti-static agents, processing aids, lubricants and/or waxes are admixed to the polymer mix.

29. In the method in accordance with claim 1, wherein one of a polyolefin and an ethylene-vinyl acetate copolymer is used as the foreign polymer.

30. In the method in accordance with claim 1, wherein the tube exiting the nozzle and expanding is cooled on at least one of an outside and an inside by cooling air at a temperature at or below room temperature.

31. In the method in accordance with claim 1, wherein the tube exiting the nozzle and expanding is cooled on an inside by the cooling and calibration mandrel which is tempered to a temperature of 25° C. to 65° C.

32. In the method in accordance with claim 1, wherein melting of the styrene polymer, injection of the physical foaming agent into the polymer melt, and cooling of the expandable polymer melt already injected with gas, to the outlet temperature is performed in the twin-screw extruder with a draw-in and plastification zone, a mixing zone and a cooling zone, a ring-shaped outlet nozzle of a length of at least 25 times a diameter (D) of a screw of the twin-screw extruder having identical parallel screws rotating in a same direction, and the physical foaming agent is introduced into the polymer melt at a pressure of less than 160 bar at an end of the draw-in and plastification zone of the twin-screw extruder and, in the mixing zone adjoining the draw-in and plastification zone, is homogenized with the polymer melt to form an expandable polymer melt and is cooled to an outlet temperature.

33. In the method in accordance with claim 1, wherein the twin-screw extruder has an amount of polymer at which it is operated underfed.

34. In the method in accordance with claim 1, wherein two or more different foaming agents are are fed separately and immediately following each other to the polymer melt.

35. In the method in accordance with claim 1, wherein the tube which exits the ring-shaped nozzle is charged on at least one of an inside and an outside with cooling air to achieve an expansion ratio of 1:2 to 1:5, and after expansion the tube is calibrated with the cooling and calibration mandrel and is cooled by contact.

36. In the method in accordance with claim 1, wherein the tube which exits the nozzle is conducted directly on at least one of an inside and an outside to a cooling device via a cooling ring which blows cooling air.

37. In the method in accordance with claim 1, wherein the pipe-shaped tube is stretched by a factor of 3 in a longitudinal extension while drawn off the nozzle.

38. In the method in accordance with claim 1, wherein the polymer melt which is injected with gas and expandable is coated with at least one of a compact material and an expandable material inside the ring-shaped nozzle prior to leaving the nozzle.

39. In the method in accordance with claim 1, wherein after the tube is cut open, the foam foil, which is laid flat, is laminated with one of a single-layer and a multi-layer compact or expandable foil on one of one side and both sides.

40. In the method in accordance with claim 1, wherein a partially open foam foil is produced from 100 parts by weight of polystyrene, 3 to 4 parts by weight of foaming agent, selected from a group of n-butane, n-pentane, isopentane, or mixtures thereof, 0.6 to 1.5 parts by weight of nucleating agents from sodium bicarbonate and citric acid with a decomposition temperature of greater than 160° C., 1 to 3.5 parts by weight of a surfactant, which reacts well with polar substances such a polystyrene, and 1 to 3 parts by weight of a foreign polymer incapable of mixing with polystyrene, such as a polyolefin or ethylene-vinyl acetate copolymer.

41. In the method in accordance with claim 1, wherein the nucleating agent is employed, together with a polymer binding agent on the basis of an acrylate polymer, at a ratio of nucleating agent to polymer binding agent of 55:45 to 65:35.

42. In the method in accordance with claim 1, wherein up to 50 wt.-% of a regenerated styrene polymer is used in lieu of fresh material.

* * * * *